United States Patent [19]

Boles et al.

[11] Patent Number: 5,381,151
[45] Date of Patent: Jan. 10, 1995

[54] SIGNAL PROCESSING FOR ULTRA-WIDEBAND IMPULSE RADAR

[75] Inventors: Sol Boles, Syosset; Dennis J. Buckland, Bethpage, both of N.Y.

[73] Assignee: Grumman Aerospace Corporation, Bethpage, N.Y.

[21] Appl. No.: 190,544

[22] Filed: Feb. 2, 1994

[51] Int. Cl.6 .............................................. G01S 7/28
[52] U.S. Cl. ...................................................... 342/21
[58] Field of Search ........................................ 342/21

[56] References Cited

U.S. PATENT DOCUMENTS

| | | | |
|---|---|---|---|
| 4,907,001 | 4/1990 | Harmuth | 342/159 |
| 5,134,408 | 7/1992 | Harmuth | 342/21 |
| 5,148,174 | 9/1992 | Harmuth | 342/21 |

*Primary Examiner*—Mark Hellner
*Attorney, Agent, or Firm*—Bacon & Thomas

[57] ABSTRACT

An ultra-wideband impulse radar system for use on an airborne platform includes circuitry for coherently integrating the signals to improve signal-to-noise ratio so as to enhance the detection capability of the system, and for motion compensation of the signals to correct for inadvertent modulations of received signals due to buffeting or vibration of the airborne platform which may otherwise corrupt the filtering and signal integration processes. The inclusion of velocity filters and coherent integration despite the lack of phase information in the signals is accomplished by exploiting the time-delay properties of the received impulse signals, in which the observable pulse repetition frequency of the received signals differs from the transmitted pulse repetition frequency by virtue of the relative velocity between signal reflecting elements and the radar platform.

8 Claims, 4 Drawing Sheets

ADC SAMPLING STREAM FORMAT

SIGNAL PROCESSING FOR ULTRA-WIDEBAND IMPULSE RADAR

BACKGROUND OF THE INVENTION

This invention relates to an impulse-type radar system, and in particular to a digital velocity filter bank for ultra-wideband impulse radar signals derived from an airborne platform in which the signals are coherently integrated to improve signal-to-noise ratio so as to enhance the detection capability of the impulse radar system.

DESCRIPTION OF RELATED ART

Ultra-wideband (UWB) radar with an impulse-type waveform provides improved performance and new capabilities for active radar surveillance systems which have previously been based on the application of a modulated waveform to a sinusoidal carrier. A wideband signal, with its inherent high range resolution, provides the capability for resolving individual scattering centers of a complex target and thereby produce the target's unique radar signature. The use of a filter matched to the expected received waveform can therefore result in enhanced detection capability, target identification, and discrimination of unwanted false targets. Competing ground clutter background is reduced with a high resolution waveform, and atmospheric propagation losses in clear and adverse weather conditions are substantially reduced by transmitting the requisite high resolution waveform without a microwave carrier, employing instead an impulse waveform of approximately 1 or 2 nanosecond duration whose carrier-free spectrum covers the UHF portion of the electromagnetic spectrum.

A further advantage of the impulse waveform over a modulated sinusoidal carrier is its greater ability to penetrate foliage, earth, and other obscurants such as concrete bunkers, because of its lower frequency spectrum. Such capabilities are vitally important in surveillance and imaging applications. Most conventional modulated sinusoidal carrier radar applications, both ground based and airborne, require target radial velocity determination where the target may be an aircraft, missile, or patch of ground as, for example, in airborne synthetic aperture radar (SAR) ground imaging systems.

Target velocity is most efficiently determined with a coherent radar, in which the signals reflected by the target emanating from a stream of N pulses issued by the radar are sorted on a range bin by range bin basis, where the range extent of each contiguous range bin is determined by the range resolution provided by the modulated waveform. Fourier transform processing is then applied to the stream of signal samples collected in each such range bin, resulting in the creation of a bank of contiguous filters in each range bin. Each filter is sensitive to a particular doppler frequency, which in turn is a measure of radial velocity. In such a filter formation process using Fourier transform processing, the frequency components in each range bin to which a filter is tuned are all aligned to the same value of phase, resulting in a coherent integration of the N pulse samples.

In airborne applications, in order to avoid smearing of energy belonging to a single filter into adjacent filters due to signal phase disturbances brought about by irregular aircraft motions, a motion compensation (Mo-Comp) system is required. Such motion compensation is normally accomplished by applying phase corrections to all incoming signals on a pulse-by-pulse basis in accordance with aircraft physical displacements sensed by an on-board inertial navigation system (INS), which can be supplemented by a strap-down inertial measuring unit (IMU) applied directly to the radar antenna, and possibly also by global positioning system (GPS) inputs.

Such functions of velocity filtering, coherent integration, and motion-compensation are also desired in airborne applications of UWB impulse radar. However, in the case of UWB impulse radar, the impulse waveform is carrier-free, and therefore has no phase associated with it. Accordingly, velocity (doppler) processing, coherent integration, and motion compensation via phase corrections, as applied to conventional sinusoidal radar, have no meaning in the context of nanosecond impulse waveforms.

SUMMARY OF THE INVENTION

It is an objective of the invention to provide a UWB impulse radar having velocity filtering, coherent integration, and motion compensation, despite the lack of a phase associated with the impulse waveform, by exploiting time delay properties of received impulse signals.

This objective is achieved by observing the pulse-repetition interval at the receiver caused by a stream of reflected signals from a target or a patch of background clutter possessing a relative velocity, V, with respect to the airborne platform, in order to determine V according to the equation $$(PRI)' = (PRI)_o (1 - 2 V/c) \qquad (1)$$

where $(PRI)_o$ is the pulse repetition interval of the transmitted stream and c is the velocity of electromagnetic propagation. In this equation, a closing relative velocity is taken as positive, and an opening velocity is negative. The resulting values of $(PRI)'$ are greater than that of the transmitted stream for an opening velocity of less than zero and less than that of the transmitted stream for a closing velocity of greater than zero.

In practice, the signal stream entering the receiver is made up of a multiplicity of $(PRI)'$ values due to background clutter extending over a large area whose many elements subtend different relative velocities with respect to the moving platform, and also possibly due to the presence of several moving targets possessing different relative velocities with respect to the platform. By establishing a signal sampling system formed from a multiplicity of analog-to-digital converters (ADC) each sampling at an incrementally different value of $(PRI)'$ corresponding to a prescribed value of velocity V as denoted by equation (1), and summing the contribution of N such samples at each $(PRI)'$ value, starting from some prescribed range time delay with respect to the first transmitted impulse of the stream of N, a contiguous velocity filter bank is created in which each filter output represents the integrated output of clutter and/or target returns possessing a particular relative velocity, to the exclusion of signals with different velocities. The number of such velocity filters is determined by the target velocity range of interest and the velocity resolution capability of the system.

DETAILED DESCRIPTION OF THE PREFERRED EMBODIMENT

Figure 1:
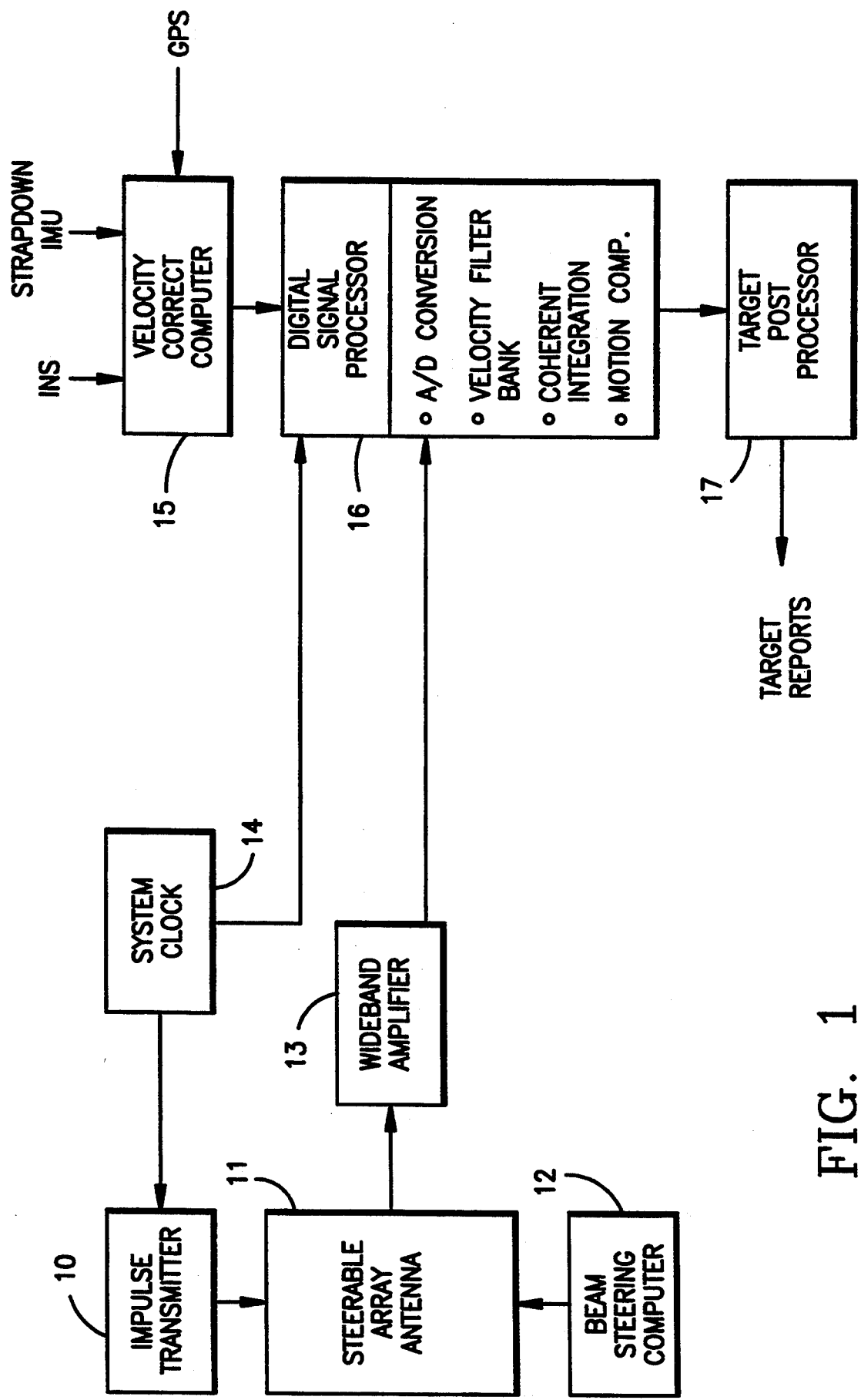
FIG. 1 is a block diagram of an ultra-wideband impulse radar system constructed in accordance with principles of a preferred embodiment of the invention.

FIG. 1 is a block diagram illustrating an impulse radar system which embodies the features and advantages of the invention. The system includes an impulse transmitter 10 which generates a stream of electromagnetic impulses at a pulse repetition frequency $(PRF)_o$ where the relationship between system pulse repetition frequency $(PRF)_o$ and the transmitter interpulse period $(PRI)_o$ is given by the equation:

$$(PRI)_o = 1/(PRF)_o. \tag{2}$$

The stream of impulses is radiated by a steerable array antenna 11 whose beam direction is controlled by a beam steering computer 12. Signals reflected by targets and background clutter are received by the same steerable array antenna 11, which preferably provides a common wide aperture for transmission and reception. The signals are amplified in wideband amplifier 13 before being passed onto a digital signal processor 16 which carries out the analog-to-digital conversion, velocity filtering, coherent integration, and motion compensation of the impulse signals. The outputs of digital signal processor 16 are passed to target post processor 17, where target parameters such as target range, relative radial velocity, target azimuth angle, and target track and identification are determined.

Figure 2A:
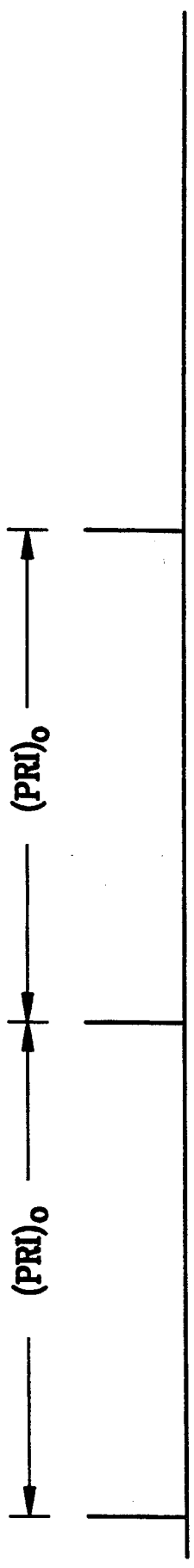
FIGS. 2a–2c illustrate the ADC sampling stream format for the system of FIG. 1.

A signal sampling format for accomplishing the required signal sampling is best illustrated by reference to FIG. 2a, which depicts a stream of radiated impulses at the system pulse repetition interval $(PRI)_o$ generated in system clock 14 shown in FIG. 1. At some prescribed time delay Td from the first transmitted impulse, corresponding to a desired starting range Rs, where $$Td = 2\ Rs/c, \tag{3}$$

a stream of range sampling strobes is issued, the time separation between such samples corresponding to a desired range resolution of the system. For example, a range resolution of one foot requires a sampling rate of 500 MHz, or a 2 nanosecond interval between samples. The number of such samples in a single pulse repetition interval depends upon the extent of the range window desired. A range window of 10 nautical miles would require approximately 60,000 such range sampling strobes, for example.

Figure 2B:
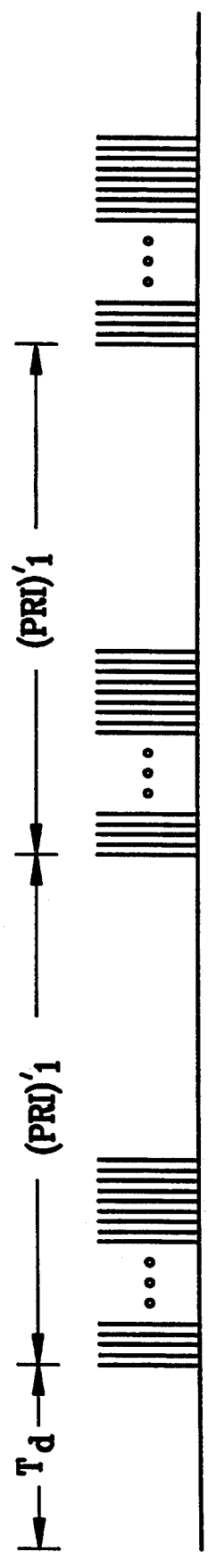
Figure 2C:
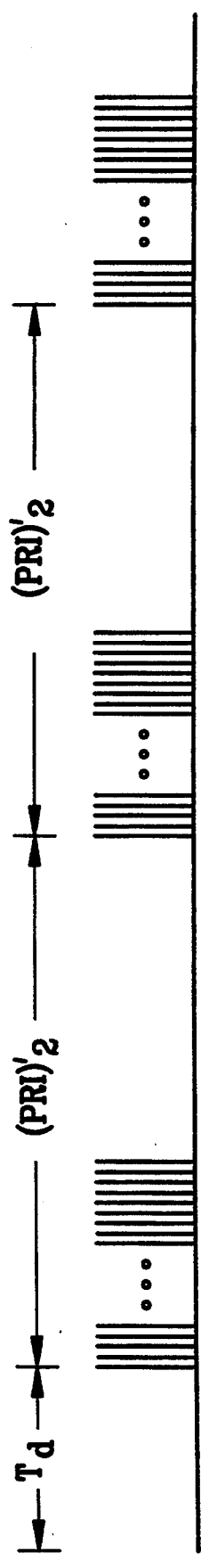

To form a velocity filter synchronized to an opening target or elemental clutter patch velocity of $-V_1$ requires that the stream of range sampling strobes again be initiated at a time delay, $(PRI)'$, from the start of the first stream of range strobes, given by $$(PRI)' = (PRI)_o (1 + 2\ V_1/c), \tag{4}$$

and that the process be repeated N times in accordance with the desired integration factor, N. By adding the contributions of the first, second, third, and subsequently the Nth signal sample in each range sample stream, a signal integration is obtained in each range bin, over the entire range window, each such sum or integration corresponding to signals returning from a target, or from clutter, possessing a relative velocity $-V_1$ with respect to the airborne platform. By repeating this process separately at a time separation $(PRI)'_2$, between consecutive range sampling streams, as illustrated in FIG. 2c, where $$(PRI)'_2 = (PRI)_o (1 + 2\ V_2/c), \text{ and} \tag{5}$$

$$V_2 = V_1 + \Delta V, \tag{6}$$

$\Delta V$ being the velocity resolution capability of the system, a velocity filter corresponding to an opening velocity, $-V_2$, is achieved, neighboring that for velocity, $-V_1$. In this manner, a bank of contiguous filters can be formed over any prescribed velocity window covering both closing and opening relative velocities.

Figure 3:
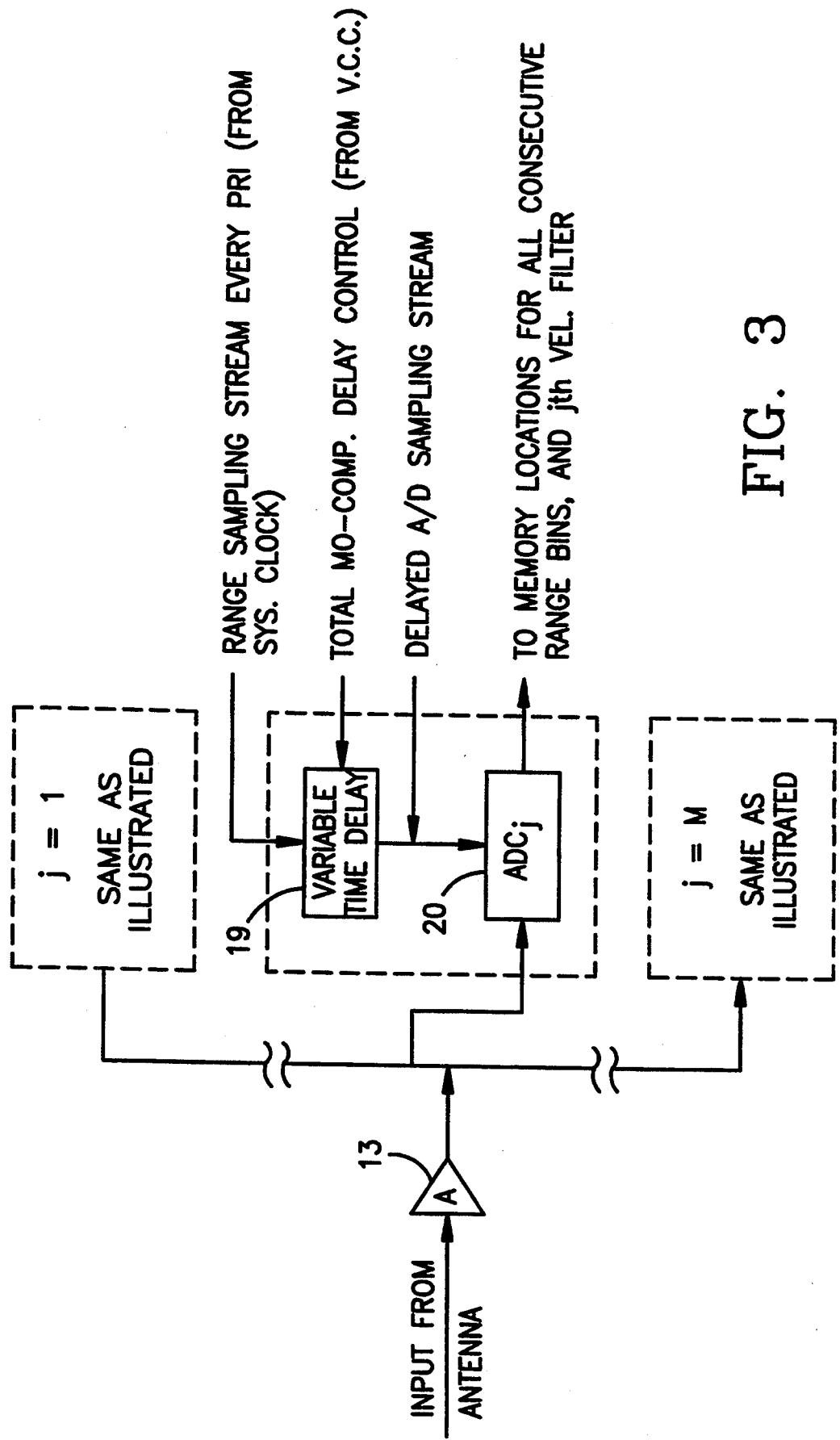
FIG. 3 is a block diagram of a digital velocity filter bank for use in the system of FIG. 1.

A functional sketch describing the formation of a digital velocity filter bank is shown in FIG. 3. A continuous analog signal stream resulting from target or clutter reflections during the interpulse interval is amplified in amplifier 13 and distributed equally to M similar circuits each containing identical elements. In the illustrated circuit, a range sampling stream whose start is delayed by a value Td corresponding to the selected range window start is issued to variable time delay 19, but with a time delay separation of $(PRI)_o$ corresponding to zero relative velocity between the start of consecutive range sample streams, as illustrated in FIG. 2b. This time delayed sequence for sampling streams is readily generated in system clock 14, shown in FIG. 1, by a basic clock reference running at the range sampling frequency of 500 MHz. Further, the basic system impulse repetition frequency, $(PRF)_o$ is formed by simple digital divide-by-two circuits applied to the system clock frequency.

To generate the velocity filter corresponding to a velocity $-V_1$ as represented by FIG. 2b requires that variable time delay 19 provide a sequence of delays $(\Delta Td)_1, 2(\Delta Td)_1, \ldots, (N-1)(\Delta Td)_1$, consecutively, to the start of each range sampling stream. The time separation between the start of each range sampling stream is $(PRI)_o$, where $(\Delta Td)_1$ follows from equation 1, and therefore $$(\Delta Td)_1 = (PRI)_o (2\ V_1/c). \tag{7}$$

Variable time delay 19 may be a programmable multiple tapped analog delay line capable of producing the required sequence of delays, the programming for which is inputted by a total motion compensation delay control issued from velocity control computer 15. A commercially available active programmable delay line may be adapted in one or more units in series for this purpose. The sampling sequence, as depicted by FIG. 2b, is inputted to analog-to-digital converter $(ADC)_j$ 20, where j is the filter index (j=0 to M), which issues digitized inputs to memory locations for all consecutive range bins in the desired range window, and repeats this process for all N sampling streams to form integrated sums in each memory location corresponding to each range bin.

Figure 4:
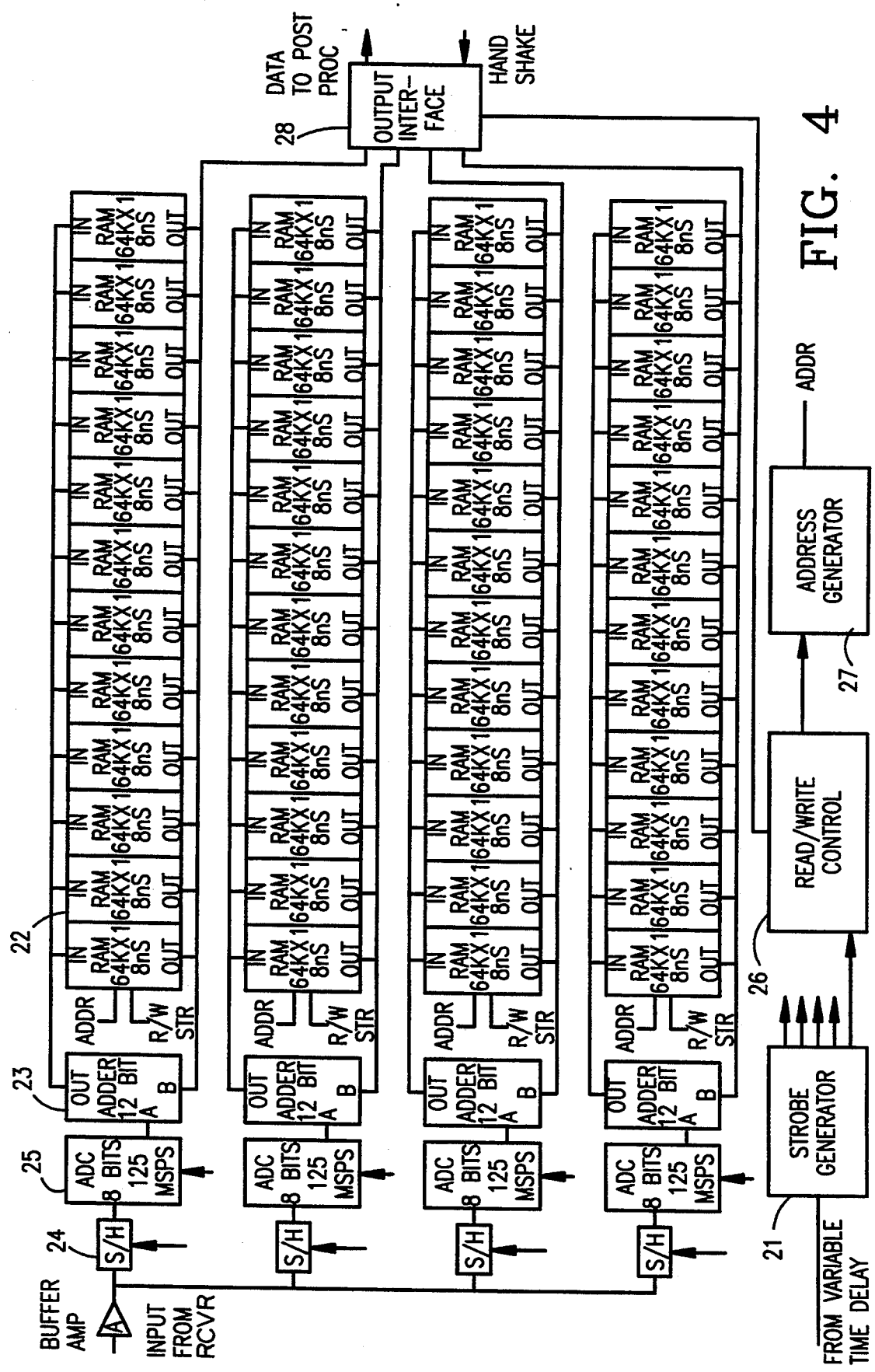
FIG. 4 is a schematic diagram of a single velocity filter/coherent integrator for use in the system of FIG. 1.

A circuit for generating a single velocity filter operating at, for example, 500 million samples per second (MSPS) corresponding to one foot spatial range resolution, is shown in FIG. 4, and may be built using commercially available components. Four sample and hold (S/H) 24 and ADC 25 combinations, each combination operating at one-fourth the desired sampling rate, or 125 MSPS, operate in parallel to produce the desired overall sampling rate of 500 MSPS. Operating in this manner, rather than with a single S/H 24 and ADC 25 pair, is preferred in order to simplify component selection and reduce costs. A typical range sampling stream, such as that depicted in FIG. 2b, is inputted to strobe generator 21, shown in FIG. 4, from variable time delay 19, shown in FIG. 3. Strobe generator 21 commutates each fourth range sampling strobe to each of the four S/H and ADC pairs, such that the top pair receives strobes 1, 5, 9, 13, etc., the second receives strobes 2, 6, 10, 14, etc., the third receives strobes 3, 7, 11, 15, etc., and the fourth receives strobes 4, 8, 12, 16, etc. throughout the full range window.

The digitized samples in each of the four S/H and ADC pairs are placed into the eight least significant bit locations of a 12-bit wide random access memory (RAM) capable of receiving inputs at an eight nanosecond rate (125 MSPS). The total memory depth is preferably 4×64,000 or 256,000, corresponding to approximately a 40 nautical mile range window. As sequential range sampling streams at a typical value of (PRI)', are inputted to the filter, the 12-bit adder 23 provides an accumulation or summing of the current sample of data with the previously stored data for every pulse at all memory locations. A 12-bit wide accumulator (adder plus memory) provides a 4-bit overflow to accommodate the full integration process. The width of the accumulator can vary and depend on the value of N and the mean value of the sampled data.

At the completion of all N sampling streams, the accumulated sums for all memory locations are outputted to post processor 17, shown in FIG. 1, via output interface 28 for range alignment where each assigned range value throughout the range window is referenced to the actual range value at the start of the integration sequence. The hand shake input controls the transfer of data from the filter memory to the post processor through read/write control 26. All addressing to the proper memory locations is done by address generator 27. This data transfer process is done for all velocity filters resulting in a two dimensional range/velocity matrix in which the net signal in each range/velocity cell represents the coherent integration over N pulse returns.

To handle closing relative velocities, for which the appropriate value of (PRI)' to produce a velocity filter is less than (PRI)$_o$ and would normally require a time advance, a succession of range sampling streams from system clock 4 to variable time delay 19 is initially separated from one another by (PRI)', where (PRI)' is intentionally selected to be less than that for the highest closing velocity sought. (PRI)' is then subsequently increased by suitable delays in variable time delay 19 to achieve any prescribed value (PRI)' corresponding to any desired closing, as well as opening, filter velocity.

In order to conserve hardware and processing associated with the formation of the velocity filter/integrator bank, as well as to prevent the loss of filter energy into contiguous filters because of inadvertent time delay modulations due to aircraft antenna buffering, a motion compensation system is preferably employed. Platform velocity projected along the beam boresight axis is tracked with an onboard inertial navigation system (INS) and also, if available, from inputs from the global positioning system (GPS). The velocity so sensed is converted to a component of time delay which becomes a central value of (PRI)' in equation (1) which the velocity filter bank is constructed to implement. In addition, the motions of the array antenna 11 resulting from buffering or local vibrations may be sensed by a strapdown inertial measuring unit (IMU) directly attached to the array antenna 11, and blended with INS and GPS outputs in a least mean square estimator such as a Kalman filter whose net output is converted to equivalent time delay corrections for determining values of (PRI)' for each velocity filter. These additional corrections are then included in the total motion compensation delay control shown in FIG. 3 for each variable time delay network in the total filter bank. Motion compensation corrections may be made at the start of each range sample stream, or at a greater rate if required.

With the proper application of motion compensation corrections to each velocity filter, the output contained in each range/velocity resolution element will contain a coherent summation from N pulse returns, each such summation corresponding to a resolvable element of clutter or target, provided that the clutter or target velocity remains substantially constant during the integration interval.

While illustrative embodiments of the subject invention have been described and illustrated with sufficient particularity to enable one skilled in the art to make and use the invention, it will be appreciated that various changes and modifications can be made therein without departing from the spirit of the present invention, and that the invention should therefore not be limited by the above description and illustrations, but rather should be limited only by the appended claims.

We claim:

1. Impulse radar apparatus, comprising:
   means, mounted on a radar platform, for transmitting a carrier-less wideband waveform which forms a pulse stream having a transmitted pulse repetition interval:
   means, mounted on a radar platform, for receiving a pulse stream which has been reflected by signal reflecting elements and which has a received pulse repetition interval: and
   filter means for respectively sampling an incrementally different value of said received pulse, said sampling means including means for providing a sequence of delays, consecutively, to the start of each range sampling stream, the time delay separation corresponding to zero relative velocity between the start of consecutive range sampling streams, and means for summing a contribution of a plurality of samples at each transmitted pulse repetition interval value starting from the prescribed range time delay with respect to a first transmitted impulse of the stream of samples, thereby creating a contiguous velocity filter bank in which each filter output represents an integrated output of clutter and/or target returns possessing a particular relative velocity to the exclusion of signals with different velocities.

2. Apparatus as claimed in claim 1, wherein a number of said velocity filters is determined by a target velocity range of interest and a velocity resolution capability of the system.

3. Apparatus as claimed in claim 1, wherein said platform is an airborne platform and further comprising motion compensation means for correcting for inadvertent modulations of the received pulse stream due to buffeting or vibration of the platform.

4. Apparatus as claimed in claim 1, wherein said means for receiving comprises a steering array antenna having a common aperture for transmission and reception, a wide-band amplifier, a digital signal processor, said digital signal processor including a plurality of analog-to-digital converters, a digital velocity filter bank, and means for coherently integrating an output of said filter bank.

5. Apparatus as claimed in claim 4, wherein said platform is an airborne platform and further comprising motion compensation means for correcting for inadvertent modulations of the received pulse stream due to buffeting or vibration of the platform.

6. Apparatus as claimed in claim 4, wherein said digital velocity filter bank comprises a plurality of sample and hold and analog-to-digital combinations, each combination operating in parallel at a fraction 1/k of a desired sampling rate, where k is the number of combinations to produce a desired overall sampling rate.

7. Apparatus as claimed in claim 6, further comprising a memory capable of receiving inputs at 1/k the desired rate, an adder for summing the current sample data with the previously stored data every pulse for all memory locations, an accumulator for accommodating an overflow, and means for outputting the accumulated sums to a post processor.

8. Apparatus as claimed in claim 1, wherein said sampling means comprises a plurality of analog-to-digital converters.

* * * * *

UNITED STATES PATENT AND TRADEMARK OFFICE
CERTIFICATE OF CORRECTION

PATENT NO. : 5,381,151
DATED : January 10, 1995
INVENTOR(S) : BOLES et al.

It is certified that error appears in the above-indentified patent and that said Letters Patent is hereby corrected as shown below:

COLUMN 6:

Line 52, "sampling" should read --filter--.

Signed and Sealed this

Eighteenth Day of July, 1995

Attest:

BRUCE LEHMAN

Attesting Officer

Commissioner of Patents and Trademarks